Patented Sept. 9, 1941

2,255,124

UNITED STATES PATENT OFFICE 2,255,124

EXTRACTION PROCESS

Marjorie B. Moore, Waukegan, Ill., assignor to Abbott Laboratories, North Chicago, Ill., a corporation of Illinois No Drawing. Application August 21, 1939, Serial No. 291,154

7 Claims. (Cl. 260—236)

The present invention relates to an improved process for obtaining concentrates of active principles e. g. alkaloidal bases from products of nature. More particularly, the present invention is directed to an improved process for extracting alkaloidal compositions from ergot.

Due to the importance of alkaloidal drugs in the pharmaceutical field, any method of extracting the active principles from their natural sources that results in a higher yield than heretofore obtainable is extremely desirable, and for this reason, considerable research has been devoted to improving the present methods and to seeking new ones. The solution to the problem is not an easy one because of the complex nature of the desired substances, and the prior methods available heretofore have been found for the most part relatively unsatisfactory due to low yields.

The methods previously used for extraction of the active principles include the use of ordinary solvents such as alcohol, in which the natural occurring salts of the alkaloidal bases are soluble; the use of unusual solvents such as liquid ammonia, which both alkalinizes and extracts; as well as the use of a combination process involving an initial treatment with an aqueous chemical bath containing carbonates, hydroxides or oxides of alkali or alkaline earth metals, followed by extraction with an organic solvent in which the alkaloidal bases formed by the initial treatment are soluble. All of the prior processes as indicated above, have been found relatively unsatisfactory due to the low yields of the desired alkaloids.

It is, therefore, an object of this invention to provide an improved process for extracting active principles from natural sources, and in particular alkaloidal bases from ergot.

Other objects will be apparent as the description hereinafter proceeds.

I have discovered that markedly increased yields of the alkaloidal bases are readily obtainable when the alkaloids are alkalinized with a metal alcoholate and extracted with a non-aqueous water immiscible solvent. In practice I have found it desirable to add the alcoholate, preferably dispersed in a small amount of alcohol, to the first portions of the water-immiscible solvent.

The following representative examples will serve to illustrate the process of the present invention.

Example I

About one kilogram of defatted ground ergot is extracted by the percolation process using ether containing sodium ethylate (corresponding to about 9 grams of sodium) dissolved in a small amount of ethyl alcohol as the extraction medium. Additional portions of ether are added as the extraction proceeds and the percolation continued to exhaustion (e. g. as indicated by the color tests) in accordance with the usual practice. The ether percolate which is slightly alkaline to litmus is next dried and filtered. Excess tartaric acid is then added, the ether removed under reduced pressure and the residue washed with pentane to remove any fatty material present.

Example II

About one kilogram of defatted ground ergot is extracted by the percolation process using ethylene dichloride containing sodium ethylate (corresponding to about 9 grams of sodium) and a small amount of alcohol as the extraction medium. Additional portions of ethylene dichloride are added as extraction proceeds and percolation continued to exhaustion in accordance with the usual practice. The percolate is then dried and filtered and the alkaloidal residue recovered in accordance with the process of Example I. Petroleum ether may be used to remove fatty material.

Experiments carried out on large and small examples of ergot have shown the present process to give 65 to 130–140 percent higher yields than are obtainable by the U. S. P. extraction process. Other experiments using the extracting fluids of the present invention have shown the yield of ergotoxine-type alkaloids (Broom and Clark assay) to be over 300 percent above the yields obtainable using the U. S. P. fluid extract. The yield of ergonovine in the present process for example, may be as high as 0.92 mg. per gram of ergot.

The solvents suitable for use in the present invention are non-aqueous and in addition are selected from the class of organic materials such as the ethers, halogenated hydrocarbons, etc. which are immiscible with water. The alkyl ethers e. g. methyl, ethyl, propyl, butyl, etc. as well as the mixed ethers along with the chlorinated and brominated hydrocarbons e. g. halogenated methane, ethane, propane, butane, etc. are generally preferred. The solvents should be such as are miscible with the alcohols in which the metallic alcoholates are dispersed as well as serving as a solvent for the alkaloidal bases. For ordinary commercial operations ethyl ether or ethylene dichloride are generally preferred.

The metallic alcoholates suitable for use in the present invention are alkaline metal alcoholates. The alkali metal (e. g. sodium and potassium) alcoholates of methyl, ethyl, propyl, butyl, etc. alcohols are examples of products serving as suitable anhydrous alkalinizing agents. Various amounts of alcoholate may be used although sufficient alcoholate i. e. alkaline metal, should be used to alkalinize or convert the alkaloidal salts to the alkaloidal bases.

The process of the present invention which is characterized by the alkalinizing of the alkaloids with a metal alcoholate coupled with the use of a non-aqueous water immiscible organic solvent, makes initial treatments with aqueous chemical baths unnecessary. In addition, the process of the present invention gives yields of desired alkaloidal drugs far above the yields obtainable using the processes heretofore available.

It will be understood that the present invention is not limited to the above illustrative examples. For example, in place of the solvents enumerated above other solvents such as benzene and the like may be used, although the ethers and particularly the halogenated aliphatic hydrocarbons are preferred. All modifications falling within the spirit and scope of the present invention are intended to be covered by the claims annexed hereto.

I claim:

1. The step in a process for extracting alkaloids from ergot which comprises treating ergot with an alkali metal alcoholate.

2. A process for extracting alkaloidal bases from ergot by water-immiscible organic solvents, characterized by the fact that the ergot alkaloids are alkalinized by an alcoholate of an alkali metal.

3. A process for extracting alkaloidal drugs from ergot which comprises converting the alkaloidal salts of ergot to alkaloidal bases by treatment with sodium alcoholate, and then extracting the bases thus formed by an extraction process employing a water-immiscible organic solvent.

4. A process for extracting alkaloids from ergot by ethylene dichloride, which includes the step of treating the ergot with an alkali metal alcoholate.

5. A process for extracting alkaloidal bases from ergot which comprises alkalinizing the ergot with sodium ethylate and extracting the ergot with ethylene dichloride.

6. A process for extracting alkaloids from ergot which comprises percolating ground ergot with a solvent consisting essentially of ethylene dichloride containing a small amount of sodium ethylate dispersed in ethyl alcohol.

7. A process for extracting alkaloidal bases from ergot which comprises subjecting ergot to an extraction treatment with a non-aqueous solvent consisting essentially of ether containing a small amount of an alkali metal alcoholate.

MARJORIE B. MOORE.